(No Model.)  4 Sheets—Sheet 1.

I. LEPLEY.
VALVE GEAR FOR HIGH SPEED WATER WHEELS.

No. 311,591. Patented Feb. 3, 1885.

Witnesses,
Geo. H. Strong.

Inventor,
Isaac Lepley
By Dewey & Co.
Attorneys

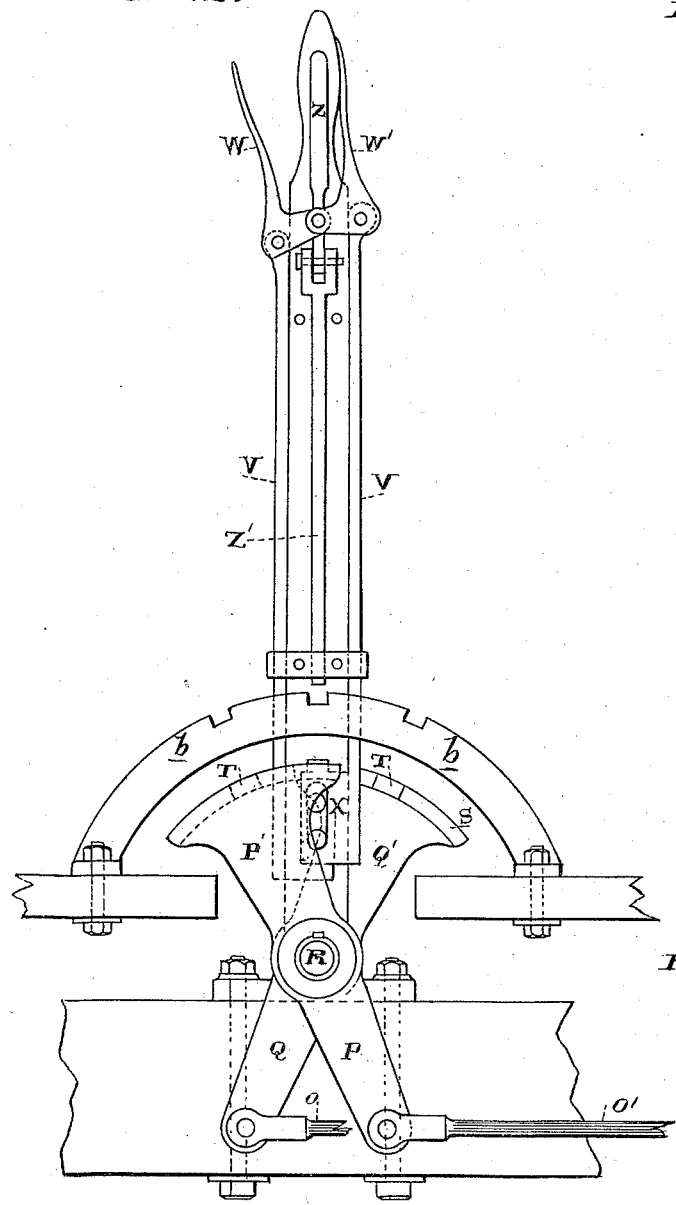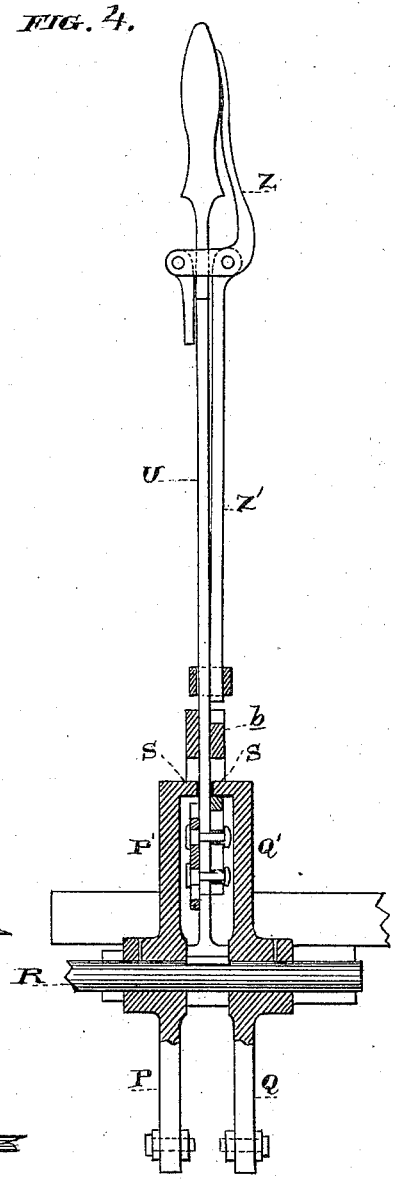

(No Model.) 4 Sheets—Sheet 3.

I. LEPLEY.
VALVE GEAR FOR HIGH SPEED WATER WHEELS.

No. 311,591. Patented Feb. 3, 1885.

Witnesses,
Geo. H. Strong.
J. S. Rourke.

Inventor,
Isaac Lepley
By Dewey & Co.
Attorneys (No Model.) 4 Sheets—Sheet 4.
I. LEPLEY.
VALVE GEAR FOR HIGH SPEED WATER WHEELS.
No. 311,591. Patented Feb. 3, 1885.
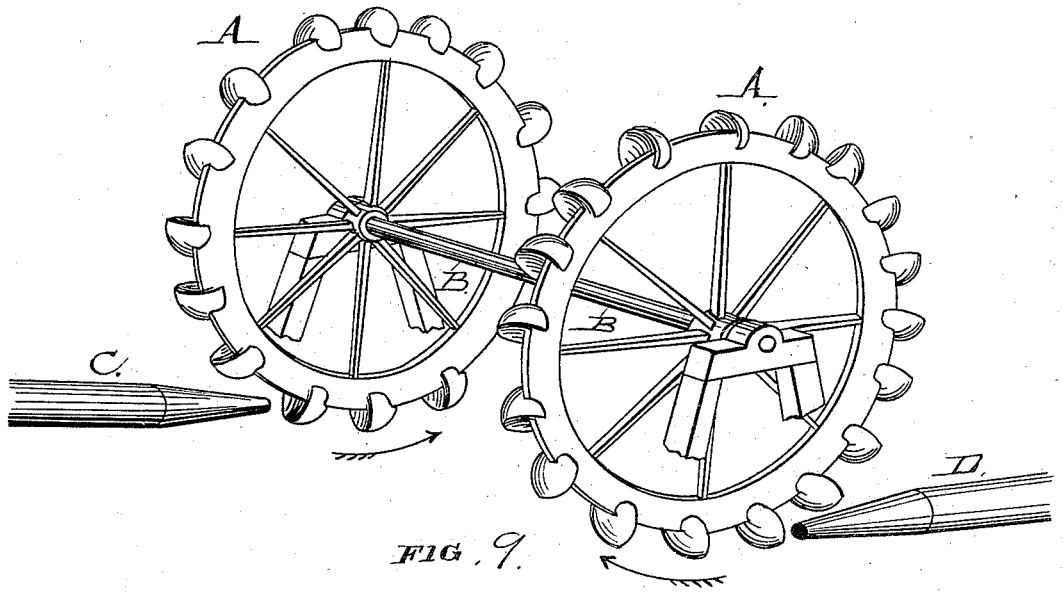
FIG. 8
FIG. 9
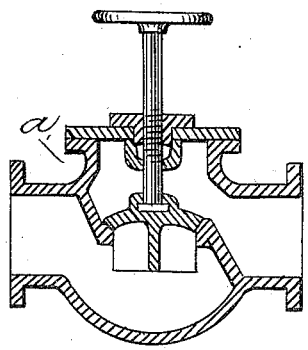
Witnesses,
Geo. H. Strong.
J. H. Rouse
Inventor,
Isaac Lepley
By Dewey & Co.
Attorneys

UNITED STATES PATENT OFFICE.

ISAAC LEPLEY, OF AMADOR CITY, CALIFORNIA.

VALVE-GEAR FOR HIGH-SPEED WATER-WHEELS.

SPECIFICATION forming part of Letters Patent No. 311,591, dated February 3, 1885.

Application filed July 9, 1884. (No model.)

*To all whom it may concern:*

Be it known that I, ISAAC LEPLEY, of Amador City, county of Amador, and State of California, have invented an Improvement in Valve-Gear for High-Speed Water-Wheels; and I hereby declare the following to be a full, clear, and exact description thereof.

My invention relates to a mechanism for opening and closing valves in the supply-pipes of water-wheels which are driven by the momentum of a column of water under a high head; and it consists of a plunger connected with the water-gate stem, and having its ends fitted to work in two cylinders placed opposite to each other, pipes leading to them from a supply-valve chamber to furnish water by which the plunger is moved to open or close the gate, and a single lever operating between disks upon a shaft, and having pawls and rods so arranged that either disk may be turned and its connecting mechanism operated to open its gate and drive the wheel in either direction, together with certain details of construction, all of which will be more fully explained by reference to the accompanying drawings, in which—

Figure 1:
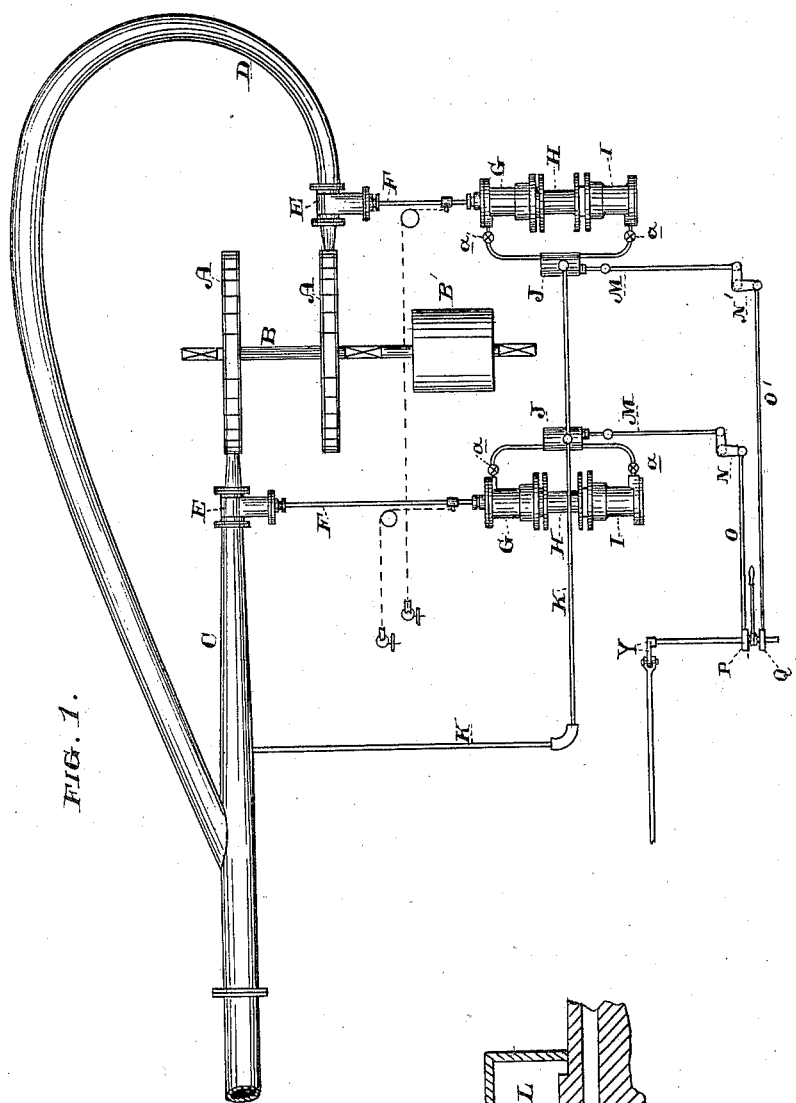
Figure 2:
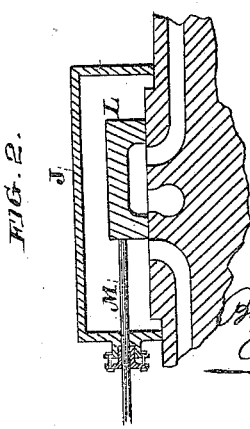
Figure 5:
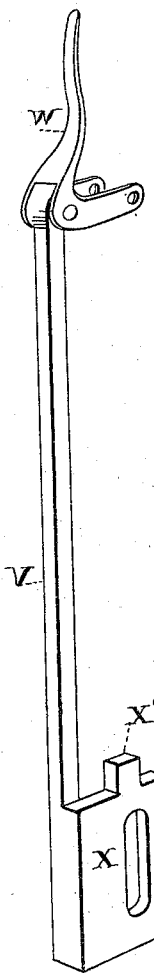
Figure 6:
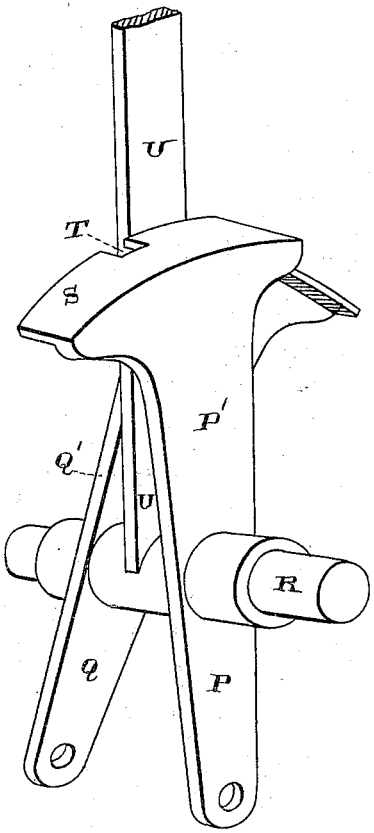
Figure 7:
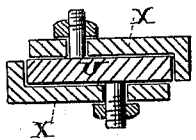

Figure 1 is a general plan view of a wheel-shaft, with forward and reverse wheels, water-gates, and operating mechanism. Fig. 2 is a section of valve. Fig. 3 is an enlarged side view of one lever with its disks and pawls. Fig. 4 is a section through the disks and an edge view of the lever. Figs. 5, 6, 7 are details of construction. Fig. 8 is a perspective view of the water-wheel A A' and shaft B. Fig. 9 is a section of valve *a*.

For hoisting and other purposes, two hurdy-gurdy or momentum water-wheels are fixed to a single shaft, with buckets so placed that the wheels may be run in contrary directions—one to hoist and the other to lower. Water to drive these wheels is supplied through pipes in which the pressure is produced by bringing it from a height of from fifty feet upward. Under such great pressure the water-gates must be closed slowly to prevent bursting the pipes. In order to prevent any sudden jar to the water-pipes by closing the gate too quickly, regulating-valves *a* are placed in the cylinder supply-pipe between the admission-valve and the cylinder. Such regulating-valves can be adjusted to open or close the gate as slowly as may be required. It is necessary that the operator should know the position of the water-gate valve, and also whether the piston operating the gate is acting promptly. For this purpose an indicator is connected to the valve-rod between the gate and cylinder by a chain or cord leading over pulleys, so that the indicator will be in view of the operator. It is also necessary to handle the gates promptly from some convenient operating point, and my mechanism is designed for this purpose.

A A' are two water-wheels of the kind mentioned, fixed to a shaft, B, which is suitably journaled, and has a winding-drum pulley or other device, B', for transmitting the power of the wheels. These wheels are set with their buckets in opposite directions, as shown in Fig. 8, and water is brought to one wheel by a pipe, C, while a branch, D, is curved around, so as to supply the other wheel from the opposite side. Each pipe has a water-gate at E, and when one is opened and the other closed water will be supplied to drive the wheel of the open gate. The rotation of the shaft is reversed by closing the first and opening the second gate. These gates have stems F, which extend through stuffing-boxes into cylinders G and connect with plungers H, one end of which in each case fits the cylinder G.

Opposite to and in line with the cylinder G is a second cylinder, I, into which the opposite end of the plunger extends, suitable stuffing-boxes being fitted around the plunger where it enters each cylinder to prevent leakage.

J is a valve-chest having a pipe, K, bringing water to it from the main pipe C or D, and a valve, L, within this chest is operated by a stem, M, so as to open the ports leading either to one or the other of the cylinders G or I. The pipes leading from the valve-chest to the ends of the cylinders have valves *a*, (see Fig. 9,) which may be opened or closed to regulate the flow of water to the cylinder, and thus prevent any sudden jar by closing the gate too quickly. When water is supplied to one of the cylinders G and allowed to escape from the cylinder I, the plunger will be moved so as to open the water-gate of its wheel, and when the valve is reversed, so that water is supplied to the cylinder I and exhausted from G, the gate will be closed. Each wheel is operated in the same manner, and in order to control them from a single convenient point the stems M connect with one arm each of bell-crank levers N N', while the other arms of the levers have rods O O' connected with them. These rods extend side by side to the point where the operator is to stand, and are connected with levers P and Q, respectively. The lever P has an upwardly-projecting arm, P', and the lever Q has a similar arm, Q'. The levers P and P' and Q and Q' have hubs which fit loosely upon the shaft R. The upper arms, P' and Q', of the two sets of levers have flanges S, which are notched, as shown at T.

Between the hubs of the levers P and Q the lower end of a hand-lever, U, is keyed rigidly upon the shaft.

Upon each edge of the lever U is a rod or bar, V, which is guided to move up and down close against the edge of the lever.

The upper ends of these rods are connected with the angles of short bell-crank levers W W', which have the inner ends of the lower arms pivoted to the side of the handle-bar near the top. The longer arms extend upward and are curved to a similar outline with the handle, so as to be easily operated, by grasping either one and pressing it up against the handle. The lower ends of the bars V have each a projection at X, and a lug, X', which, when the rod is drawn up by pressing its hand-piece W or W' against the handle of the lever U, will be caused to engage the notch T of either lever, P' or Q', which is to be moved. By moving the lever U forward or back it will then carry with it the lever-arms P P' or Q Q', which it is desired to actuate, and through the rod O or O' and the bell-crank lever N or N' the valve-stem and valve with which it is connected will be moved, and water admitted to move the piston H and the water-gate. By this means either gate is easily opened or closed and either wheel A A' is driven, so that the shaft B and its connected mechanism may be given either a forward or backward motion. In most cases where these wheels have been erected they have superseded steam-engines which are already in place to do the hoisting. With my lever the engine can remain in place ready to be used if water fails, or if for any reason the wheels cannot be used. All that is needed is to remove the old lever from the link-shaft and put my lever in its place, with the loose levers or devices to connect with the water-power gates, the link-arm Y on the end of the shaft being disconnected when using water-power and reconnected when steam-power is to be used again. Z is a hand-lever similar to W and W', and it has a rod, Z', extending down alongside the lever U. This rod has its lower end fitted to engage notches in rack b, and when it is caused to so engage it holds the lever U at any desired point, and with it either of the lever-arms, Q or P, which may at the time be engaged with it. All of the levers W, W', and Z are caused to fall away from the handle of U by gravitation or by the action of springs, so that the lever U is not normally connected with either of the levers P Q. Either of these hand-levers W, W', or Z may be grasped and pressed against the handle of the lever U, and thus throw its particular connected mechanism into or out of action, the whole being controlled by the single lever U. By placing the cylinders G and I in line, slightly separated, and fitting the plunger H to work into both cylinders, with a portion exposed between them, any water which may leak from either cylinder will escape and not pass from one end of the cylinder to the opposite end of the plunger to impede its movement, as would be the case if it moved in a single cylinder. Leakages are thus noticed at once, and the cylinders may be repacked without stopping.

Having thus described my invention, what I claim as new, and desire to secure by Letters Patent, is—

1. The water-wheels fixed to a single shaft with buckets formed to receive water from opposite directions, pipes with gates through which water is discharged upon the wheels, in combination with gate-stems connected with plungers fitted into cylinders which are placed in line, and with an open interval between their adjacent ends, substantially as herein described.

2. The water-gate-actuating plunger, the cylinders G and I, with an open interval between them, pipes leading from the outer ends of the cylinder to a valve-chamber having a valve through which water may be admitted to them, and a valve-stem, in combination with a mechanism by which the valve may be moved, consisting of stems M, rods O O', and levers, whereby the ports leading to one or the other of said cylinders may be opened, substantially as herein described.

3. The valve-stems, with the connecting-rods and bell-crank levers, in combination with the double lever-arms loosely mounted upon a shaft, with a hand-lever moving between them, and means for connecting it with either of the arms, substantially as herein described.

4. The hubs having the arms P P' and Q Q' turning loosely upon a shaft, each connected with the water-gate valve-gear of one of two oppositely-moving wheels, in combination with a hand-lever placed between the arms P' Q', and mechanism by which it may be connected with either of said arms, substantially as herein described.

5. The levers P Q, connected with the valve-gear of oppositely-revolving water-wheels, and the lever-arms P' Q', with the notched flanges, as shown, in combination with the hand-lever moving between the arms, short levers W W', and rods with lugs X', which may be caused to engage the notched flanges of either arm by means of the levers W W', substantially as herein described.

6. The shaft R, loose double levers P P' Q Q', intermediate hand-lever, with the hand-pieces W, W', and Z, and the connecting-rods with lugs to engage the lever-arms P' Q', or the rack $b$, in combination with the double water-wheel valve-gear and connecting-rods, substantially as herein described.

7. The combination, with the water-gate-actuating plunger and the cylinders G I, of pipes leading from the outer ends of the cylinders to a valve-chamber having a valve through which water may be admitted, a stem, M, rods O, and levers N and P, for operating the valves, and a regulating-valve, $a$, substantially as described.

In witness whereof I have hereunto set my hand.

ISAAC LEPLEY.

Witnesses:
 HENRY TREZISE,
 JOS. M. BRAY.